Oct. 2, 1923. 1,469,366
F. H. PALMER
AUTOMOBILE CRADLE
Filed April 22, 1922  3 Sheets-Sheet 1
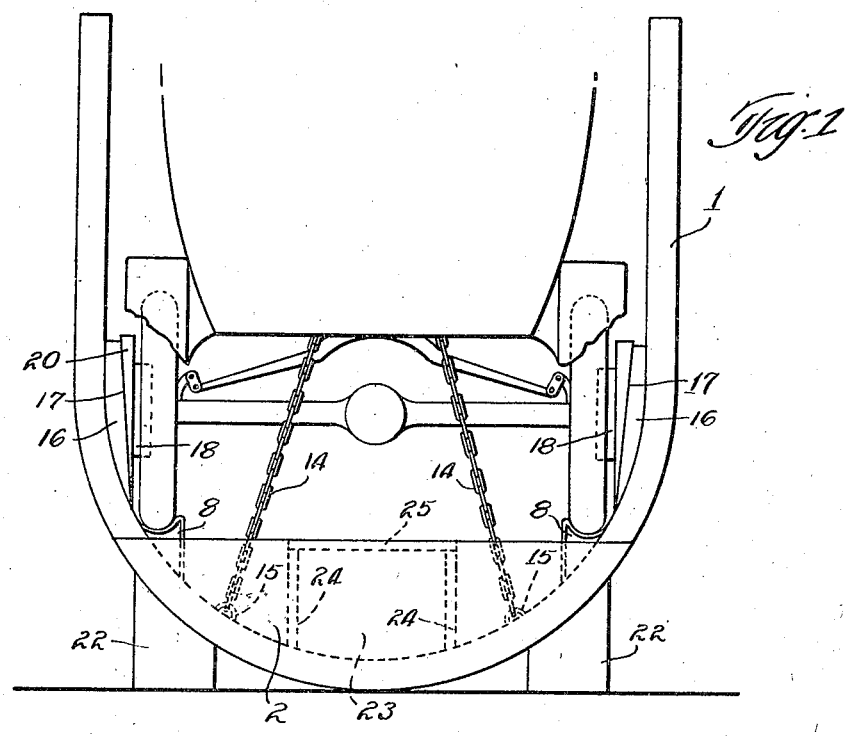
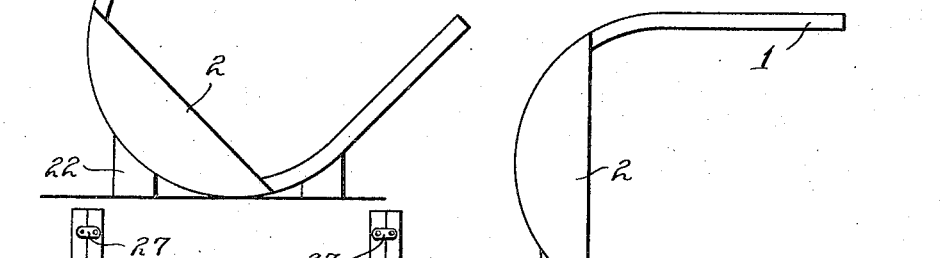
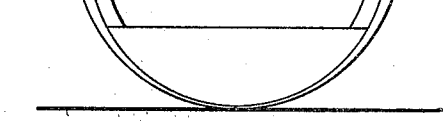

Oct. 2, 1923.
F. H. PALMER
1,469,366
AUTOMOBILE CRADLE
Filed April 22, 1922
3 Sheets-Sheet 2
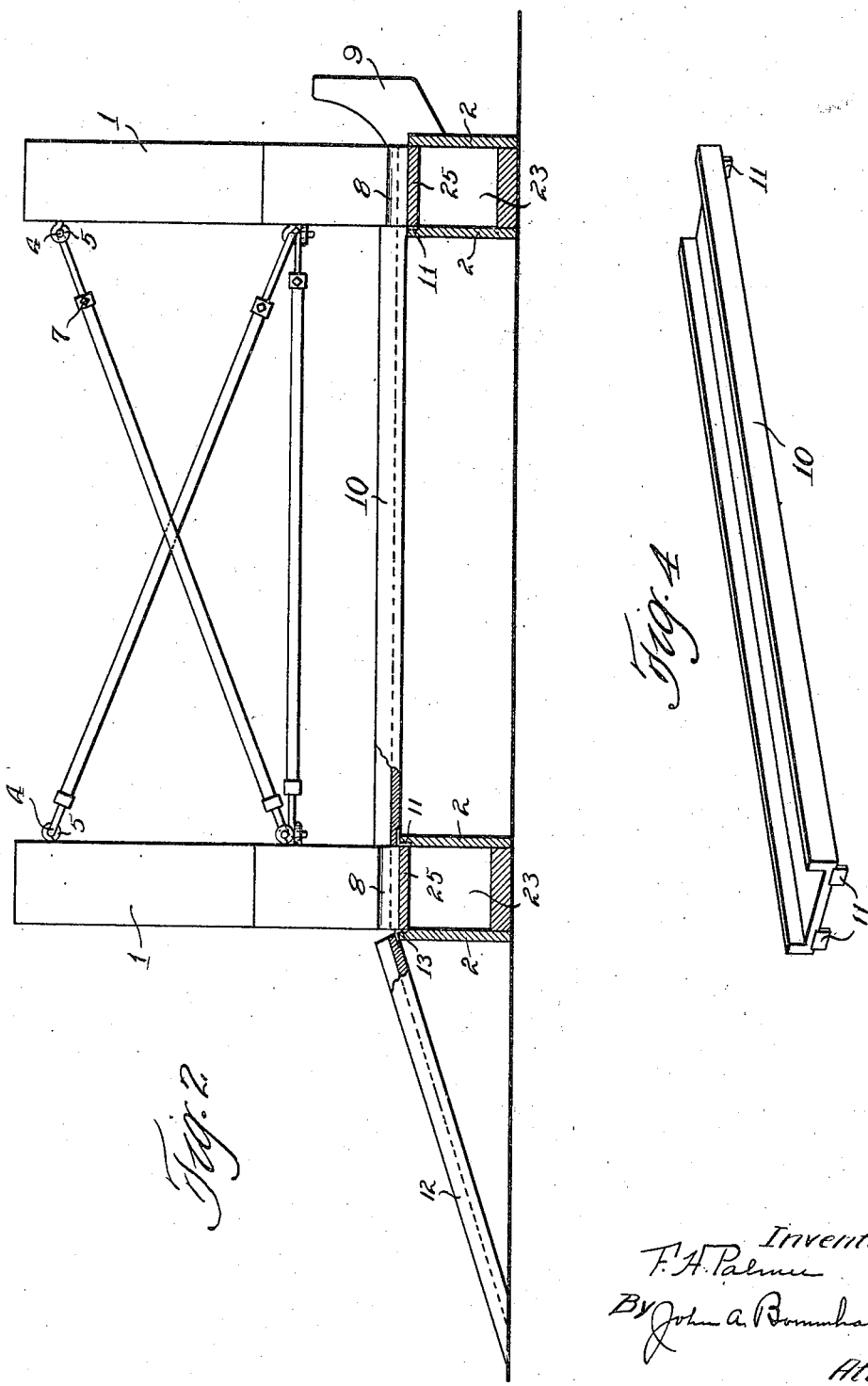

Oct. 2, 1923.
F. H. PALMER
1,469,366
AUTOMOBILE CRADLE
Filed April 22, 1922    3 Sheets-Sheet 3
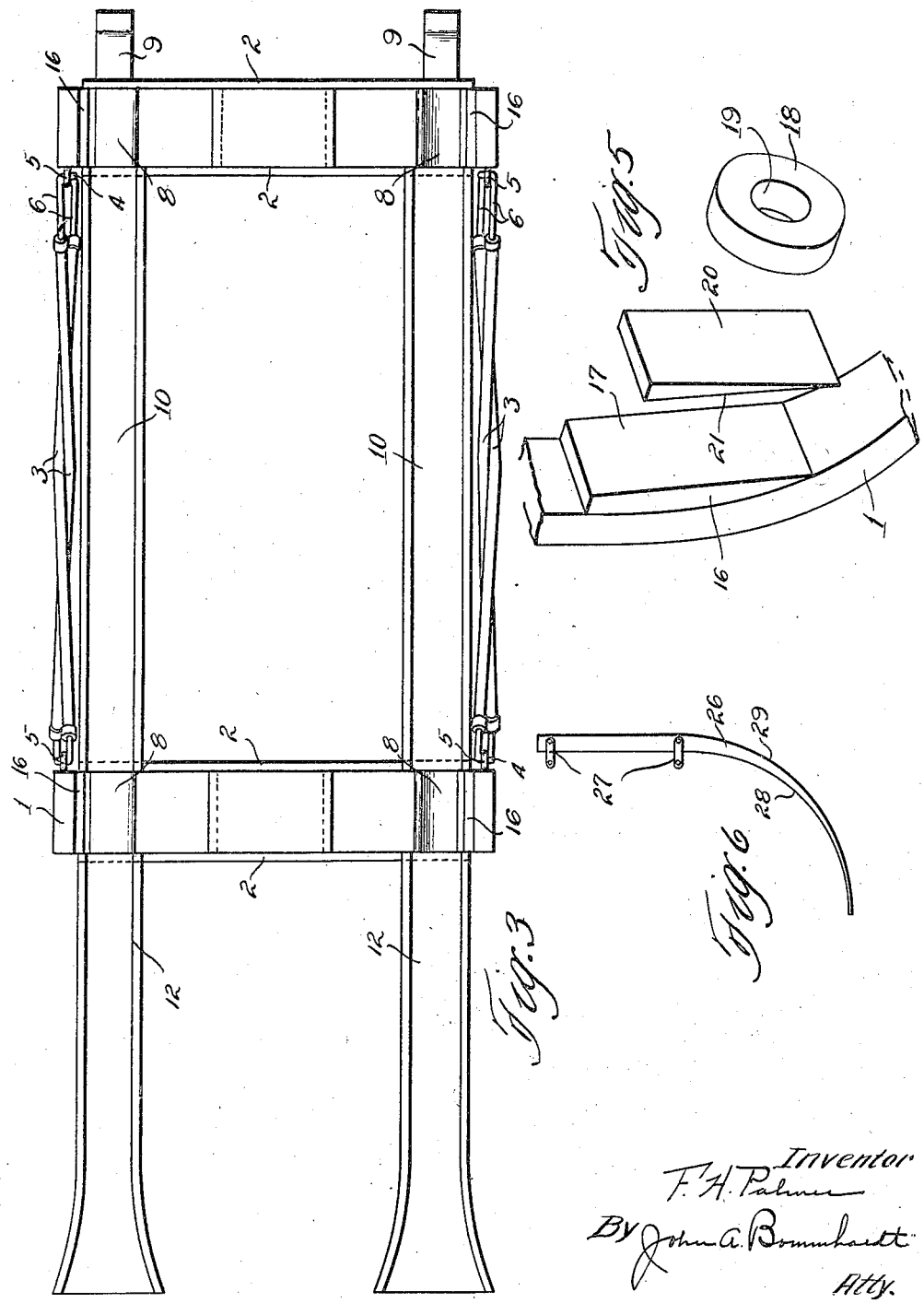

Patented Oct. 2, 1923.

1,469,366

UNITED STATES PATENT OFFICE.

FREDERICK H. PALMER, OF CLEVELAND, OHIO.

AUTOMOBILE CRADLE.

Application filed April 22, 1922. Serial No. 556,104.

*To all whom it may concern:*

Be it known that I, FREDERICK H. PALMER, a citizen of the United States, residing at Cleveland, in the county of Cuyahoga and State of Ohio, have invented certain new and useful Improvements in Automobile Cradles, of which the following is a specification.

This invention relates to automobile cradles used for tilting an automobile on its side, and has for its principal object to provide a device of this character which will be available in any garage and which will not require a special space therein for its use and one which can be set up any place in said garage, and when not in use can be dismantled quickly and put away in a very compact form. Another object is to provide a device of this character which can be adjusted for use with automobiles of different wheel bases. A further object of the device is to provide novel means for securely fastening the automobile therein. A still further object is to provide means for changing the center of gravity of said device for different automobiles used therein. The device is simple of construction and is very cheap to manufacture.

In the drawings Fig. 1 is an end elevation of the device showing an automobile mounted therein; Fig. 2 is a longitudinal transverse section through the device; Fig. 3 is a top plan view thereof; Fig. 4 is a detail perspective view of one of the runways; Fig. 5 is a separated perspective view of the parts for preventing lateral movement of the car when placed therein; Fig. 6 is a detailed side elevation of an attachment used on the device for changing the center of gravity thereof; Figs. 7 and 8 are diagrammatic end elevations showing different positions to which the device may be adjusted to facilitate work upon a car mounted therein and Fig. 9 is a diagrammatic end elevation showing the manner of attaching the parts shown in Fig. 6.

Referring to the drawings by reference numerals, 1 indicates U-shaped end members or rockers which are strengthened at their bends or bottom positions by segments 2 on each side thereof. The front and rear U-members 1 are connected together by diagonal braces 3 on each side thereof which have hooks 4 at the ends thereof which engage in eyes 5 on the frames 1. These braces are crossed and sprung as indicated in Figs. 2 and 3 and the hooks on one brace are entered into the eye 5 from the opposite sides to which the hooks on the other brace are entered and in this manner the braces themselves will hold each other in place. The U-members are further connected and strengthened by straight braces 3ª. These braces can be adjustable by having reduced ends 6 which will telescope within the braces and which will be held in the desired position by set screws 7. Each frame 1 has channeled supports 8 thereon upon which the wheel of the automobile rests when in the cradle. One of the frames 1 has stops 9 in line with the supports 8, which will position the forward end of the car when it is run into the cradle.

When the device is set up runways 10 having hooks 11 on each end thereof are placed between the two frames in line with the supports 8 and the hooks 11 engage in notches in the braces 2. Runways 12 having hooks 13 lead from the floor to the cradle, said runways being also placed in line with the supports 8 and the runways 10 as indicated in Figs. 2 and 3.

The automobile is then run up the runway 12 across the supports 8 and runways 10 until the front wheels come in contact with the stops 9. The front wheels of the car then rest upon the supports 8 on the forward frame and the rear wheels of the car rest upon the supports 8 on the rear frame. The car is then held down by chains 14 which have one end connected to the frame as indicated at 15 and the other end fastened to the car.

Blocks 16 having an inclined face 17 are placed within the frame 1 on opposite sides thereof as is clearly shown in Fig. 1. A disk 18 having a hollow portion 19 is placed against the wheel, the hub entering the hollow portion 19 and the face of the disk bearing against the spokes.

A wedge 20 is then driven between the disk 18 and the block 16, the wedge 20 having an inclined face 21 which is complementary to the inclined face 17 of the block 16. As will readily be seen when the car has been run onto the supports 8 and fastened down by chains 14 on the front and rear thereof and the blocking mechanism just described is attached to each wheel, the car is held rigidly within the cradle and the cradle can be rocked to any desired position as is shown by Figs. 7 and 8 and held in said position by chock blocks 22, the same blocks being used to hold the cradle in upright position while the car is being loaded therein or unloaded therefrom.

In practice the center of gravity of the car should be below the center of the semi-circular ends of the frames 1 so that the frames will normally tend to stay in an upright position. As is well known the center of gravity of different cars varies and in case it is desired to use the cradle with a car whose center of gravity will come above the center of the semi-circular end of the frames 1 this can be overcome by placing weights within a box 23 which is formed between the segmental braces 2 by transverse plates 24 and top 25.

Another way of overcoming this is to attach the parts 26 shown in Fig. 6 to the frame 1 by the lugs 27 as is shown in Fig. 9. These attachments 26 are the same width as the frames 1 and have their inner radius 28 the same as the outer radius of the frames 1 and have their outer radius 29 somewhat larger than the inner radius 28 and as will be clearly seen when these are attached to the cradle the center of the cradle will be raised, whereas the center of gravity of the car within the cradle will remain the same.

As stated above the center of gravity of the car within the cradle should be below the center of the semi-circular end of the frames 1 which will enable the cradle to be rocked into the positions shown in Figs. 7 and 8 or any position between that shown in Fig. 1 and that shown in Fig. 8 with a minimum amount of effort.

After the car has been run into the cradle and secured thereto the runways 10 and 12 are removed so that free access may be had to the car for work on the driving gear or engine thereof, or any part of the underside of the car.

I claim:

1. The combination with a rocking cradle in which a vehicle may be supported, of means to vary the center of gravity of the cradle when the vehicle is mounted therein, comprising a box in the bottom of the cradle, in which weights may be placed.

2. The combination with a rocking cradle in which a vehicle may be supported, of means to vary the center of gravity of the cradle when the vehicle is mounted therein, comprising supplemental side pieces attachable to the sides of the cradle and having exterior surfaces of greater radius than the normal sides of the cradle.

3. An automobile cradle comprising a pair of U-shaped rockers having supports therein for the automobile, and removable runways fitting between the rockers and in line with the supports, so that the automobile may be run on to said supports.

4. An automobile cradle comprising a pair of U-shaped rockers having supports therein for the automobile and removable runways fitting between the rockers and in line with the supports, so that the automobile may be run on to said supports, said runways having means at the ends thereof to engage the inner sides of the rockers and support the runways therebetween.

5. An automobile cradle comprising a pair of U-shaped rockers provided therein with supports for an automobile, and segmental plates secured to the sides of the rockers at the bends thereof.

In testimony whereof, I affix my signature in presence of two witnesses.

FREDERICK H. PALMER.

Witnesses:
 JOHN A. BOMMHARDT,
 BESSIE F. POLLAK.